Patented Oct. 25, 1932

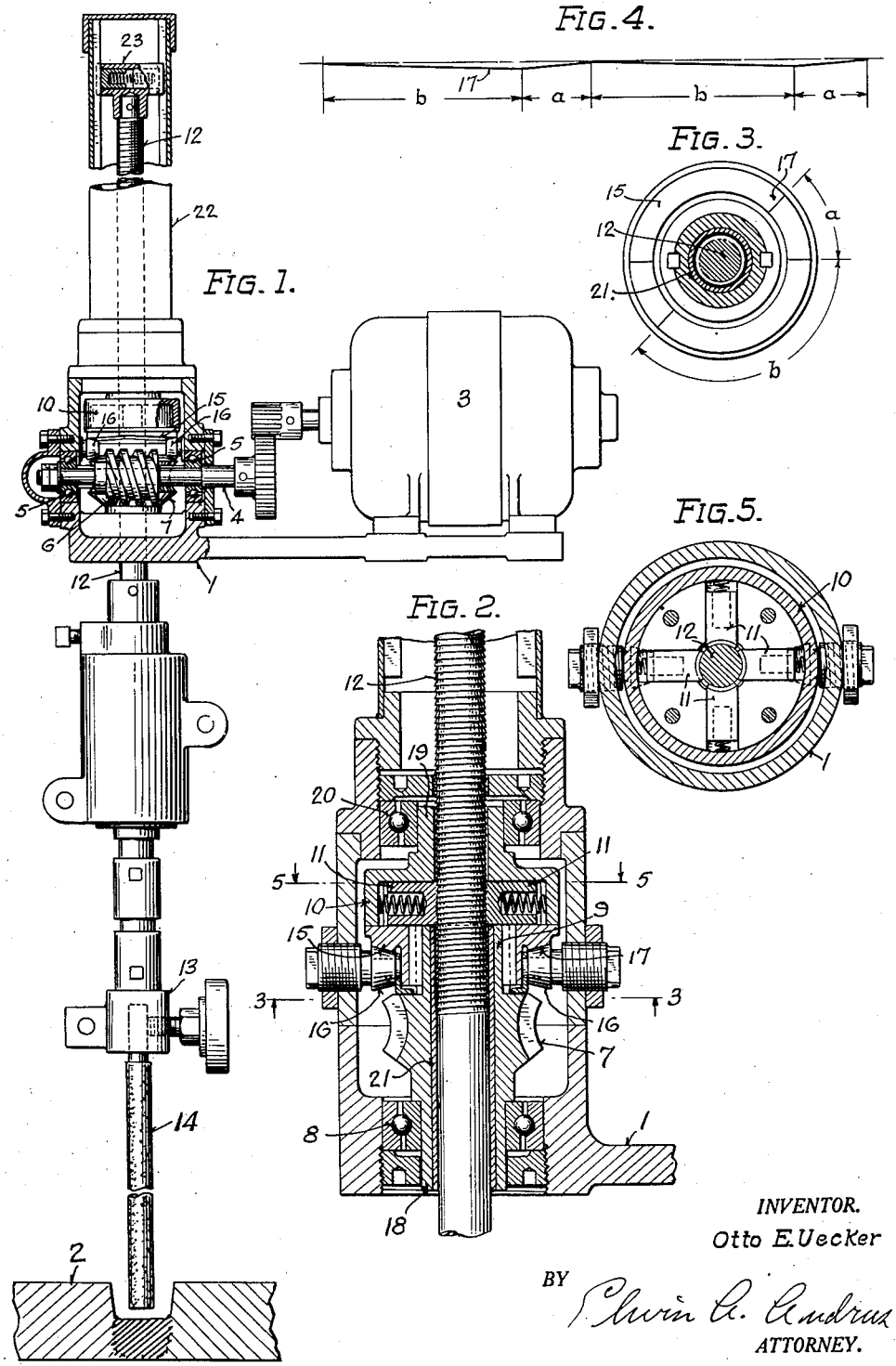

1,884,396

UNITED STATES PATENT OFFICE

OTTO E. UECKER, OF MILWAUKEE, WISCONSIN, ASSIGNOR TO A. O. SMITH CORPORATION, OF MILWAUKEE, WISCONSIN, A CORPORATION OF NEW YORK

APPARATUS FOR ELECTRIC ARC WELDING

Application filed February 17, 1930. Serial No. 429,057.

This invention relates to apparatus for electric arc welding and is particularly adaptable for welding processes wherein a fusible metallic electrode is employed.

Another object of the invention is to provide apparatus for feeding an electrode toward the arc with a vibratory or rapidly intermittent movement to impart improved characteristics to the arc.

Another object of the invention is to provide an apparatus for carrying out the above purposes and which is simple, efficient and durable.

The accompanying drawing illustrates an embodiment of the invention and the views therein are as follows:

Figure 1 is a side elevation of the welding head.

Fig. 2 is an enlarged vertical central section through the driving mechanism.

Fig. 3 is a plan view of the cam surface on the lower side of the feed nut taken on line 3—3 of Fig. 2.

Fig. 4 is a projection illustrating the cam surface.

Fig. 5 is a section on line 5—5 of Fig. 2.

The welding head has a frame 1 which is supported in any suitable manner above the parts 2 to be welded. A feed motor 3 is mounted on the frame 1 and drives a counter shaft 4 extending horizontally across the head and journaled in bearings 5 in the frame 1.

A worm gear 6 is keyed to the counter shaft 4 and is arranged to drive a pinion 7 which rotates on a vertical axis and is supported by a bearing 8 in the frame 1. The pinion 7 has an upward extension 9 to which a feed nut 10 is splined for rotation with the pinion and for relative vertical movement with respect thereto. The feed nut 10 is provided with radially movable spring pressed thread engaging members 11 for engaging a threaded feed rod 12, the lower end of which is provided with a clamp 13 for holding the electrode 14.

The thread of the members 11 and rod 12 is preferably of the buttress type so as to permit rapid upward movement of the rod through the nut and at the same time allow the members 11 to control the downward movement of the rod.

The feed nut 10 has a shoulder 15 which rotatably supports the nut on a pair of oppositely disposed rollers 16 journaled in upright members of the frame 1. The lower surface 17 of the shoulder 15 is irregular and cam shaped so that as the nut is rotated by the pinion 7, it is raised and lowered upon the supporting rollers 16. The preferred shape of the cam surface 17 is illustrated in Figs. 3 and 4 and is such that the raising of the nut 10 at intervals of one half a revolution is at approximately the same speed as the downward feed of the screw feed rod 12 so that the electrode 14 is intermittently fed toward the work 2 during the welding operation.

The pinion 7 has a stub shaft 18 journaled in the bearing 8 in the frame 1, while the feed nut 10 has an upward extension 19 journaled in a bearing 20 in the frame. The two bearings 8 and 20 are aligned, and the nut 10 and pinion 7 are provided with a vertical longitudinal opening through which the feed rod 12 passes. A sleeve 21 in the pinion 7 guides the feed rod 12 in its longitudinal advance during welding.

The frame 1 has a vertical upward extension 22 enclosing the upper end of the screw feed rod 12 and providing a guideway for a cross-head 23 on the upper end of the rod 12. The guideway and cross-head are designed to prevent turning of the feed rod 12 during the welding operation.

The distance through which the feed nut 10 is raised by the cam surface 17 may be approximately one to three hundredths of an inch and the periodic feed of the electrode is preferably between one and eight cycles or periods of feed per second.

The cam surface 17 may be designed to provide any desired period of stopping of the electrode feed, and may even provide a reversal in feed so that a vibratory feed is given to the electrode as distinguished from an intermittent feed.

The intermittent feed thus imparted to the electrode 14 tends to provide a more uniform flow of metal through the arc and has been found to facilitate the control of the arc length within predetermined limits and to enable the maintaining of a shorter arc length during welding.

The head herein shown may have any suitable means for striking the arc and for controlling the rate of the forward feed of the electrode to maintain the arc.

I claim:

1. An apparatus for electric arc welding comprising a motor disposed for feeding a fusible electrode toward the work to be welded to maintain an electric arc between said electrode and the work, a screw feed rod for holding the electrode, a threaded feed nut engaging said screw feed rod and operatively connected to by said motor to feed the electrode downwardly toward the work, and means engaging said feed nut to effect periodic longitudinal movements thereof and thereby cause an intermittent forward feed of the electrode.

2. In an apparatus for electric arc welding, in combination, a weldrod holder, a screw feed rod disposed to control the movement of the holder, a feed nut cooperating with the threaded rod, means for rotating the nut to cause the rod to feed toward the work, and means supporting said feed nut for alternately raising and lowering the nut a predetermined distance during rotation to impart an intermittent feed to the weldrod holder.

3. In an apparatus for electric arc welding, in combination, a weldrod holder, a screw feed rod connected to the holder, a feed nut cooperating with the feed rod, means for rotating the nut to cause the rod to feed toward the work, and a cam member disposed between the feed nut and a fixed support to impart an intermittent feed to the weldrod holder.

4. In an apparatus for electric arc welding, in combination, a weldrod holder, a threaded feed rod connected to the holder, a feed nut cooperating with the rod, means having a cam face for supporting the feed nut, and fixed means disposed to cooperate with the cam face to raise and lower the feed nut during rotation thereof.

5. In an apparatus for electric arc welding, in combination, a weldrod holder, means for feeding the weldrod holder to the work, and a cam support for said feeding means disposed to cooperate therewith and impart an intermittent forward feed to the weldrod holder.

6. In an apparatus for electric arc welding, in combination, a weldrod holder, a threaded feed rod, rotatable means disposed to engage the feed rod and feed it downwardly, a support for the rotatable feeding means, and means for alternately raising and lowering said support to impart an intermittent feeding motion to the weldrod holder.

In witness whereof I have hereunto signed my name at Milwaukee, Wisconsin, this 12th day of February, 1930.

OTTO E. UECKER.